United States Patent [19]
Erdman

[11] 3,763,952
[45] Oct. 9, 1973

[54] TRANSMISSION CONTROL MECHANISM
[75] Inventor: Leon Paul Erdman, Beaver Dam, Wis.
[73] Assignee: Deere & Company, Moline, Ill.
[22] Filed: Oct. 4, 1971
[21] Appl. No.: 186,011

[52] U.S. Cl.............. 180/65 R, 56/11.8, 74/473 R, 180/54 F, 180/77 R
[51] Int. Cl...................... B60k 17/08, B60k 19/00
[58] Field of Search................ 180/54 F, 54 R, 1 F, 180/55, 56, 57, 77, 70, 65 R, 60; 74/473 R; 56/11.8, DIG. 22

[56] References Cited
UNITED STATES PATENTS
3,648,797   3/1972   Lukens et al................. 180/54 D X
2,040,594   5/1936   Bixby.................................... 73/473
2,547,317   4/1951   Gustafson............................ 74/473

FOREIGN PATENTS OR APPLICATIONS
904,419   2/1945   France................................ 74/473
442,399   2/1936   Great Britain....................... 74/473
342,718   2/1931   Great Britain....................... 74/473

Primary Examiner—Kenneth H. Betts
Assistant Examiner—Milton L. Smith
Attorney—H. Vincent Harsha et al.

[57] ABSTRACT

A riding mower has a pair of rear drive wheels with a combination transmission and drive axle disposed between the drive wheels. The main frame includes a rear hooded compartment immediately over the transmission, and a number of batteries and an electric drive motor in the compartment. The motor is connected to the transmission by means of a belt drive, and the transmission is controlled by a relatively short shift arm extending upwardly and forwardly from the transmission. The transmission control lever extends upwardly and forwardly along one side of the compartment to clear the electric drive components and has its forward end in a shift quadrant at the forward end of the compartment, the rearward end of the control lever being connected to the shift arm by a laterally extending connecting mechanism, which shifts the shift arm in the same pattern as the forward end of the control lever.

6 Claims, 2 Drawing Figures

PATENTED OCT 9 1973　　3,763,952

INVENTOR.
LEON P. ERDMAN

TRANSMISSION CONTROL MECHANISM

BACKGROUND OF THE INVENTION

This invention relates to a transmission shift control mechanism and more particularly to shift control mechanism having particular utility on a relatively small vehicle, such as a riding mower or the like.

Many small vehicles, such as small lawn and garden tractors or riding lawn mowers, include a shiftable transmission directly combined with the rear drive axles and disposed between the rear wheels, the combination drive axles and transmission being commonly referred to as transaxles. The transmissions are generally shifted by a control lever extending forwardly from the transmission in the center of the tractor.

In a lawn and garden tractor, which conventionally has a forward engine, this presents no problem, a shift lever being disposed under the operator's seat at the rear of the tractor. However, in a riding mower, which conventionally has its power source over the rear axle, the shift lever can interfere with the power source and drive components.

SUMMARY OF THE INVENTION

According to the present invention, there is provided a novel mechanism for shifting such a transmission, so that the shift lever is disposed at the side of the vehicle, and does not interfere with the components in the central area of the vehicle.

More specifically, such a shift mechanism is provided for a battery powered vehicle, having its batteries and drive motor mounted in the compartment above the transaxle, the shift arm extending from the transaxle only a relatively short distance, so that it does not interfere with the batteries and motor, and being actuated by a novel shift mechanism, which includes a shift lever extending forwardly along one side of the battery and motor compartment.

Another feature of the invention resides in the provision of a mechanism which has the same shift pattern at the manually actuated end of the shift lever as it does at the shift arm on the transmission, and further in the provision of means for reducing the amount of travel at the manually actuated end of the shift lever.

Still another feature of the invention resides in its simple and economic construction.

DESCRIPTION OF THE PREFERRED EMBODIMENT

Figure 1:
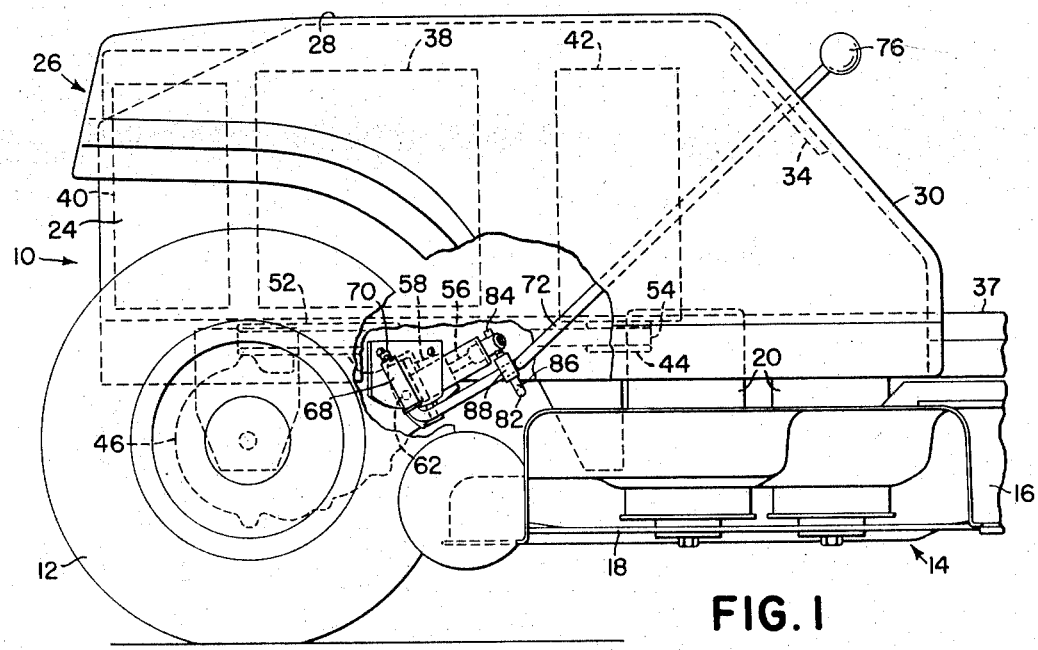
FIG. 1 is a side elevation view of the rear portion of a riding mower, with portions of the mower being removed to more clearly show the invention and other components of the mower schematically shown by dashed lines to illustrate their general location.

The invention is embodied in a riding mower, only the rear portion of which is shown in the drawings. The mower includes a mobile main frame 10 mounted on a pair of rear drive wheels 12 and a pair of steerable front wheels (not shown). A rotary mower 14 is suspended from the main frame between the front and rear wheels and includes a generally horizontal housing 16 having an open bottom and enclosing a pair of horizontal blades 18 mounted directly on the shafts of electric motors 20.

The main frame 10 includes a pair of fore-and-aft extending frame members 22 which are at opposite sides of the vehicle at the rear of the machine, but converge so that they are more closely spaced at the forward end of the machine. Mounted on the rear portion of the main frame is a box-like structure or rear compartment 24, which is covered by a formed hood 26 with a generally horizontal top 28 and a downwardly and forwardly inclined front wall 30 provided with a generally rectangular opening 32 substantially spanning the width of the hood. An instrument panel 34 is mounted on the forward portion of the rear compartment 24 immediately behind the opening 32. An operator's seat (not shown) is mounted on top of the hood 26 immediately behind the front wall 30, so that the operator's feet are supported on a horizontal deck 37, only the rearward end of which is shown in the drawings.

The hood 26 is raisable to expose the drive components mounted within the compartment 24. The illustrated riding mower is batery powered, and a plurality of batteries 38 having an associated battery charger 40 are disposed in the rearward portion of the compartment 24, both the batteries and the charger being schematically shown in the drawings. A vertically oriented DC motor 42 is mounted in the compartment 24 forwardly of the batteries 38, and suitable electric switches and relays are provided for controlling the supply of power from the batteries to the motor. A V-belt pulley 44 is attached to the motor output shaft at the lower end of the motor.

A combination transmission and drive axle, generally referred to as transaxle, is indicated in its entirety by the numeral 46 and includes a pair of laterally extending drive axles 48 connected to the opposite rear wheels 12. As is apparent, the transaxle is disposed below the rear compartment 24 between the drive wheels 12 and has a vertical input shaft 50 on which is mounted a V-belt pulley 52 connected to and driven by the motor pulley 44 by a drive belt 54.

The transaxle 46 is of known construction and provides for three forward speeds and a reverse. The transmission is controlled by a relatively short shift arm 56, which extends upwardly and forwardly from a cap 58 attached to the forward end of the transmission housing. The shift arm 56, as is well known, is swingable about a ball joint within the cap 58 and a central vertical arc, in which the transmission is in a neutral condition, or in horizontal arcs from either end of the vertical arc to shift the transmission into different gear ratios. The above described "H" shift pattern is, of course, well known, the cross portion of the pattern being the neutral portion and lying in a vertical plane, while the leg portions at the opposite ends of the cross portion lie in horizontal planes, the shift arm shifting the transmission from neutral into a gear as it moves along in a horizontal direction from the neutral condition.

A support bracket 60 is rigidly affixed to the transmission housing at the base of the cap 58 and journals a transverse rockshaft 62, which extends toward the right side of the machine and is rockable about a horizontal axis. An L-shaped bracket 64 is rigidly attached to and extends in a radial direction from the inner end of the rockshaft 62, one leg of the bracket extending parallel to the rockshaft and having a longitudinal slot 66 extending parallel to the rockshaft. The slot 66 slidably receives the shift arm 56 to permit lateral movement of the shift arm only, the vertical movement of the shift arm being accomplished only through the rocking of the bracket 64 and the rockshaft 62 on which it is mounted about the transverse axis of the rockshaft.

An upwardly and rearwardly inclined pivot socket 68, having its axis normal to the axis of the rockshaft 62, is rigidly attached to the outer end of the rockshaft and pivotally receives the rearward end 70 of an elongated control lever 72. As is apparent, the control lever extends upwardly and forwardly from its rearward end 70, which forms an approximate right angle with the remainder of the control lever. The forward end of the control lever extends through an H-shaped opening or shift quadrant 74 in the instrument panel 34 and has a shift knob 76 at its end to facilitate manipulation by a seated operator. The opening 74 is at the right side of the machine, and the shift pattern corresponds to the pattern of the shift arm 56.

The control lever 72 has a Z-shaped bend 80 in its lower end, and a transversely extending link rod 82 has its inner end 84 bent through a 90° turn and pivotally received in a bore at the end of the shift arm 56, while the outer end 86 of the rod 82 is similarly provided with a 90° bend and is received in a socket 88 rigidly attached to the control lever 72 adjacent the bend 80. The axes of the link rod ends 84 and 86 and the control lever end 70 are all parallel and extend upwardly and rearwardly parallel to the vertical movement of the shift arm 56.

Figure 2:
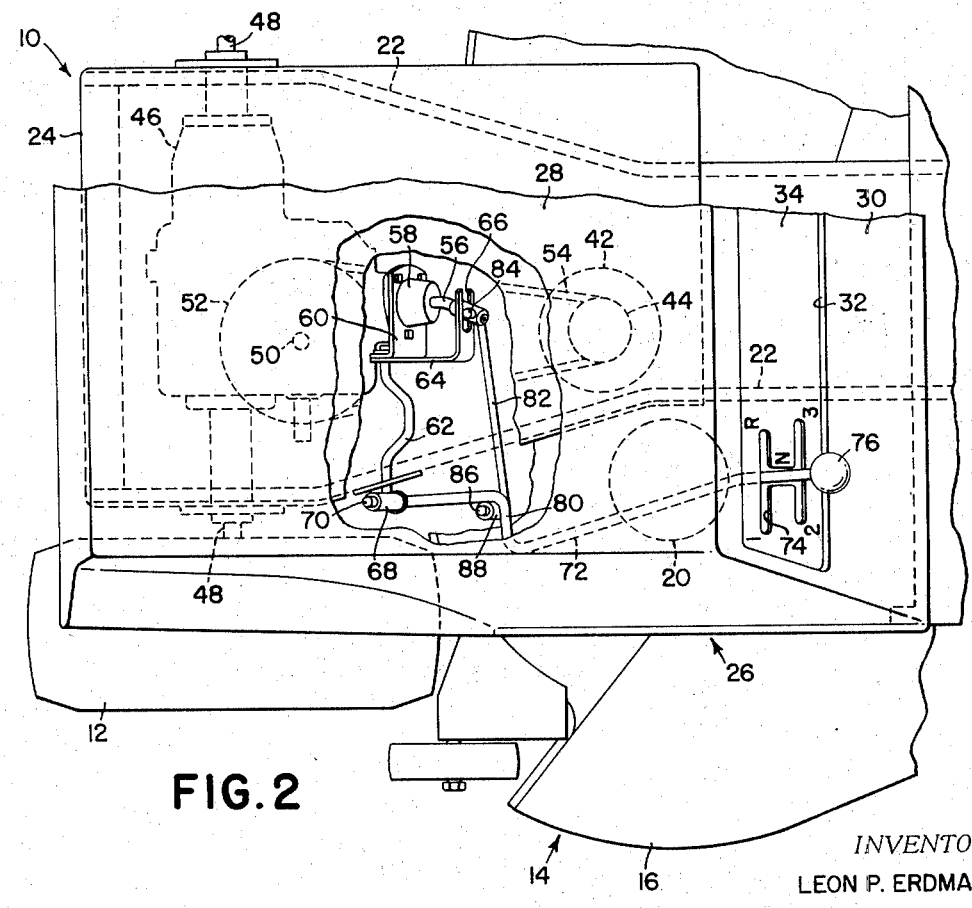
FIG. 2 is a plan view of the rear portion of the riding mower, with portions of the vehicle removed to more clearly disclose the invention.

In operation, when the control lever 72 is in its neutral position, as shown in FIG. 2, it is swingable in a vertical arc about the axis of the rockshaft 62, and since the lower end 70 swings in the socket 68 only about an axis normal to the axis of the rockshaft 62, the vertical adjustment of the control lever 72 will rotate the rockshaft 62 about its axis, thereby swinging the L-shaped bracket 64 about the axis of the rockshaft. This swinging movement of the bracket 64 swings the shift arm 56 in a vertical arc about the horizontal axis of the ball and socket pivot of the shift arm 56 within the transmission cap 58. Since the horizontal axis of the shift arm 56 is forwardly and above the horizontal axis of the rockshaft 62, a given amount of travel for the slotted end of the bracket 64 will provide a greater angular movement of the shift arm 56 and the bracket 64. Thus, when moving the shift lever 72 between its extremes in the neutral condition, it travels through a lesser number of degrees than the shift arm 56, reducing the amount of vertical travel of the forward end of the control lever necessary to provide the full degree of movement of the shift arm 56.

The control lever 72 is movable to the right or to the left in a horizontal direction from the upper end of the neutral position to respectively establish first or reverse gear ratios in the transmission, since the lateral movement of the control lever 72 is transmitted to the shift arm 56 through the link rod 82. As is apparent, the end of the shift arm 56 slides along the slot 66 when it is shifted laterally, the bracket 64 being held rigid during the lateral movement of the control lever 72. Similarly movement to the right or the left from the lower end of the neutral position respectively establishes second and third gear ratios in the transaxle 46 by laterally shifting the arm 56. Again, since the shift arm swings laterally about its ball and socket connection within the cap 58, which is located a shorter distance from the axis of the inner end 84 of the link rod 82 than the distance between the control lever end 70 and the other end 86 of the link rod, the control lever will swing fewer angular degrees about its axis than the shift arm 56 for a given amount of movement of the shift arm, thereby reducing the amount of lateral movement necessary at the forward end of the control lever. Thus, both the vertical and the horizontal dimensions of the shift quadrant or opening 74 are reduced from the amount of opening that would be required if the control lever 72 were connected directly to the shift arm 56.

I claim:

1. In a vehicle having a mobile main frame at least partly supported on a pair of drive wheels driven through a manually shiftable change speed transmission controlled by a shift arm extending from the transmission a relatively short distance and pivotally mounted therein for swinging about a first axis between first and second positions wherein it maintains the transmission in a neutral condition, and swinging about a second axis generally normal to the first into third and fourth positions from the first position and into fifth and sixth positions from the second position to establish different drive relationships in the transmission, the improvement comprising: a rockshaft pivotally mounted on the vehicle for rocking about an axis between first and second positions; a bracket rigidly connected to the rockshaft and swingable therewith; means connecting the bracket to the shift arm for shifting the shift arm between its first and second positions in response to rocking of the rockshaft between its first and second positions; an elongated control lever having one end pivotally connected to the rockshaft for swinging in a first direction about an axis extending in the same general direction as the second axis of the shift arm and normal to the axis of the rockshaft, said control lever also being swingable in a second direction normal to the first about the axis of the rockshaft to shift the rockshaft between its alternate positions; and link means pivotally connected to the shift arm and to the control lever remote from the rockshaft and operative to swing the shift arm from its first position to its third or fourth positions or from its second position to its fifth or sixth positions in response to swinging of the control lever in its first direction.

2. The invention defined in claim 1 wherein the rockshaft axis is parallel to and offset from the first axis of the shift arm.

3. The invention defined in claim 1 wherein the means connecting the bracket to the shift arm includes a slot in the bracket slidably receiving the shift arm and elongated in a direction generally parallel to the movement of the shift arm about its second axis to permit free movement of the shift arm about its second axis, the sides of the bracket slots engaging the shift arm to swing the shift arm about its first axis as the bracket swings with rockshaft.

4. The invention defined in claim 3 wherein the vehicle includes an operator's station with a shift quadrant having an "H" pattern opening, the other end of the control lever extending through the opening and being movable along the cross-bar portion of the opening to swing the shift arm between its first and second positions and along the opposite leg portions of the opening to respectively swing the shift arm between its third and fourth positions and between its fifth and sixth positions.

5. In a vehicle having a mobile main frame partly supported on a pair of rear drive wheels and including a rear hooded compartment mounted on the main frame and having a front wall, an operator's seat mounted on top of the hooded compartment immediately behind the front wall, a change speed transmission disposed generally between the drive wheels and having a shift arm swingable to different positions to establish different drive relationships in the transmission, and a drive means within the hooded compartment, the improvement comprising: a shift quadrant opening on the front wall of the hooded compartment laterally offset from the vehicle centerline; an elongated control lever substantially disposed within and along one side of the compartment and having a forward end extending through the opening for manipulation by an operator from the seat; a transverse rockshaft pivotally mounted on the vehicle for swinging about a horizontal transverse axis; a pivot means normal to said horizontal axis and operatively connecting the rearward end of the control lever to the rockshaft to rock the rockshaft in response to vertical movement of the shift lever; bracket means operatively connecting the rockshaft to the shift arm for swinging the shift arm in a vertical arc in response to rocking of the rockshaft; and a link means pivotally connected to the shift arm and to the control lever for swinging the shift arm laterally about an axis normal to the transverse horizontal axis in response to lateral displacement of the control lever.

6. The invention defined in claim 5 wherein the drive means includes a battery means and an electric motor in the compartment, and the control lever is disposed laterally of the battery means and motor.

* * * * *